US008305911B2

(12) United States Patent
Diwakar et al.

(10) Patent No.: US 8,305,911 B2
(45) Date of Patent: Nov. 6, 2012

(54) SYSTEM AND METHOD FOR IDENTIFYING AND MANAGING SERVICE DISRUPTIONS USING NETWORK AND SYSTEMS DATA

(75) Inventors: Kiran P. Diwakar, Maharashtra (IN); Sumeet Mathur, Andhra Pradesh (IN)

(73) Assignee: CA, Inc., Islandia, NY (US)

( * ) Notice: Subject to any disclaimer, the term of this patent is extended or adjusted under 35 U.S.C. 154(b) by 221 days.

(21) Appl. No.: 12/431,040

(22) Filed: Apr. 28, 2009

(65) Prior Publication Data
US 2010/0271956 A1    Oct. 28, 2010

(51) Int. Cl.
H04J 3/14 (2006.01)
H04L 1/00 (2006.01)
H04L 12/26 (2006.01)
G06F 11/00 (2006.01)
G05B 9/02 (2006.01)

(52) U.S. Cl. ........ 370/250; 370/229; 370/242; 370/244; 370/245; 714/26; 700/81

(58) Field of Classification Search .................. None
See application file for complete search history.

(56) References Cited

U.S. PATENT DOCUMENTS
2004/0181370 A1* 9/2004 Froehlich et al. ............. 702/187
2009/0300173 A1* 12/2009 Bakman et al. ............... 709/224
2010/0083145 A1* 4/2010 Schang et al. ................. 715/760

* cited by examiner

Primary Examiner — Ayaz Sheikh
Assistant Examiner — Sori Aga
(74) Attorney, Agent, or Firm — Baker Botts L.L.P.

(57) ABSTRACT

A method for identifying disruptions using network and systems data includes receiving resource utilization information for a network component at a first time and receiving resource utilization information for the network component at a second time. The method also includes identifying a resource utilization pattern for the network component, predicting a resource utilization for the network component at a third time based on the resource utilization pattern, and determining whether the predicted resource utilization will breach a utilization threshold for the network component.

23 Claims, 3 Drawing Sheets

SYSTEM AND METHOD FOR IDENTIFYING AND MANAGING SERVICE DISRUPTIONS USING NETWORK AND SYSTEMS DATA

TECHNICAL FIELD OF THE INVENTION

This invention relates generally to the field of information technology and more particularly to a system and method for identifying and managing disruptions using network and systems data.

BACKGROUND OF THE INVENTION

The ability to identify, prevent, and respond to failures of components and systems is one aspect of information technology (IT) systems management. Previous systems management techniques have involved setting appropriate thresholds manually that persisted over a period of time. When a threshold was breached, the system would generate an alert for a system administrator. Due to the static nature of manual thresholds, such systems do not readily adapt to different utilizations during certain times of the day, week, month or even year based on usage profiles. Thus, certain IT management systems may employ adaptive thresholds that adjust threshold utilization levels according to usage profiles. Based on network behavior at different time periods, the threshold utilization level may be adjusted. As with manual thresholds, adaptive thresholds may generate an alert when the threshold utilization level for the usage profile is breached.

SUMMARY OF EXAMPLE EMBODIMENTS

In accordance with one embodiment, a method for identifying disruptions using network and systems data includes receiving resource utilization information for a network component at a first time and receiving resource utilization information for the network component at a second time. The method also includes identifying a resource utilization pattern for the network component, predicting a resource utilization for the network component at a third time based on the resource utilization pattern, and determining whether the predicted resource utilization will breach a utilization threshold for the network component and in turn breach the threshold for the service that this network component is part of.

In accordance with another embodiment, a system for identifying disruptions using network and systems data includes an interface and a processor. The interface is configured to receive resource utilization information for a network component at a first time and receive resource utilization information for the network component at a second time. The processor is configured to identify a resource utilization pattern for the network component, predict a resource utilization for the network component at a third time based on the resource utilization pattern, and determine whether the predicted resource utilization will breach a utilization threshold for the network component and in turn breach the threshold for the service that this network component is part of.

Numerous technical advantages are provided according to various embodiments of the present disclosure. For example, certain methods and systems may facilitate proactive systems management by predicting future utilizations of network components. As another example, certain methods and systems may predict failures of business services, and thus limit the loss of such services. As a further example, certain methods and systems may allow customers and users to better anticipate the needs and demands of their information technology (IT) environments and projects.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings. As used in this document, "each" refers to each member of a set or each member of a subset of a set. It should be understood at the outset that, although example implementations of embodiments are illustrated below, the present invention may be implemented using any number of techniques, whether currently known or not. The present invention should in no way be limited to the example implementations, drawings, and techniques illustrated below.

Figure 1:
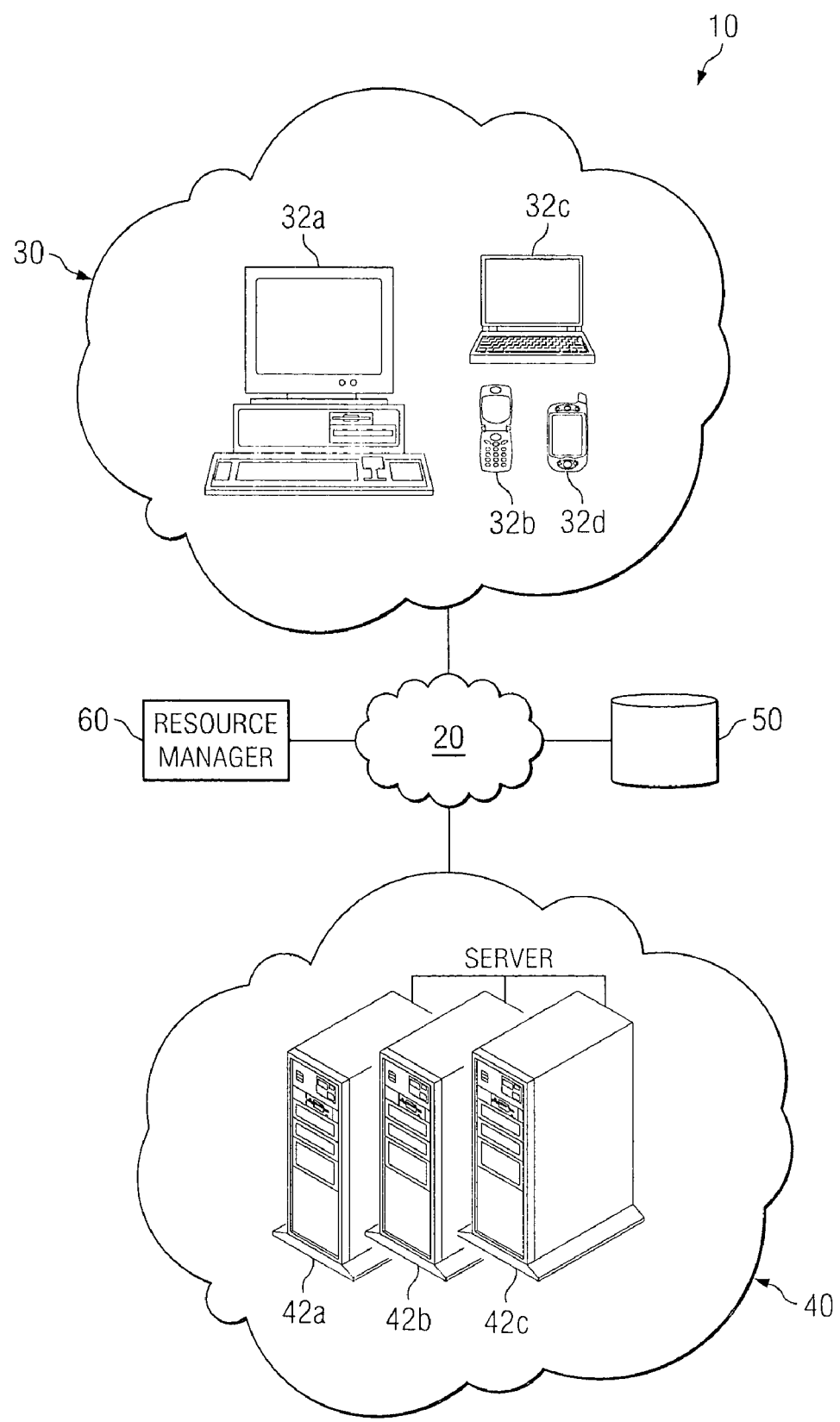
FIG. 1 is a block diagram illustrating one embodiment of an information system.

FIG. 1 illustrates an information system 10 for managing according to a particular embodiment. Information system 10 may generally represent an enterprise communication and computing system and comprise a computing environment 30, a server pool 40, and/or one or more databases 50 coupled to a network 20. As illustrated, information system 10 also includes a resource manager 60 for managing and monitoring system resources within information system 10. Examples of system resources may include, but are not limited to, database capacity, central processing unit (CPU) usage, power consumption, and bandwidth.

For enterprise networks, such as information system 10, the ability to identify, prevent, and respond to failures of components and systems may limit the number and scope of service disruptions and outages. System or component failures may occur when utilization levels for systems or components exceed a certain capacity. Therefore, information technology (IT) monitoring systems may enforce threshold utilization levels that can generate alerts when utilization of a particular system or component approaches designated capacities. Static thresholds may not be suitable for dynamic networks where utilization can fluctuate throughout a day, month, or year. Accordingly, adaptive thresholds may be enforced, which adjust threshold utilization levels for systems and components. For example, an IT monitoring system may determine that 90% utilization for electronic mail (email) systems between 9 am and 10 am is not a problem because employees typically check their email accounts when they arrive at work. As with static thresholds, adaptive thresholds may identify when a threshold breach occurs and generate an alert or take a certain action in response to the breach.

In addition to enforcing static and/or adaptive thresholds embodiments of resource manager 60 may also identify usage patterns for system resources and predict future usage levels based on such resource usage patterns. The predicted future usage levels may support the forecasting of system peaks and potential threshold utilization violations. Using such forecasts, a system administrator, such as a human operator or a computer executing software or other logic, may implement automated actions, such as provisioning a machine or system, moving the load from one machine or system to another machine or system, and/or proactively adjusting threshold utilization levels for a machine or system. Thus, resource manager 60 may not only identify when a threshold utilization breach occurs, but also predict when such a breach will occur.

Network 20 represents communication equipment, including hardware and any appropriate controlling logic, for interconnecting elements coupled to enterprise network 20. Network 20 may generally be any communication network capable of transmitting audio and/or video telecommunication signals, data, and/or messages. In certain embodiments, network 20 may comprise all or a portion of a public or private data network, a local area network (LAN), a metropolitan area network (MAN), a wide area network (WAN), or an enterprise intranet. Network 20 may include one or more routers, hubs, switches, or gateways. Although network 20 is illustrated as a single entity, network 20 may comprise any number of networks or interface with other networks such as Internet 22.

Computing environment 30 includes a plurality of interconnected communication devices 32a-32d. Communication devices 32 may generally include laptop computers, desktop computers, personal digital assistants (PDAs), wireline telephones, mobile phones, televisions, or any other device or component capable of facilitating data exchanges over a network. Elements of computing environment 30 may be connected via a fixed broadband connection such as a digital subscriber line (DSL), cable modem, or Ethernet. Elements of computing environment 30 may also be connected wirelessly through a wireless access network (WLAN), worldwide interoperability for microwave access (WiMAX), or wireless fidelity (Wi-FI) access point.

Server pool 40 may include one or more servers 42a-42c that run server applications. In particular, server pool 40 may host dedicated applications for components coupled to network 20, such as computers 32 and communication devices 34. Such applications may include software or other logic embodied in a computer-readable medium that support the transfer of email, files, calls, or other types of communication or data. Examples of server pool 40 may include a Web server or a database server.

Database 50 may represent a data management system that stores data and information associated with components of information system 10. Database 50 may include any suitable software and hardware for organizing and storing data. Embodiments of database 50 may store multi-user applications that may be accessed via network 20.

Resource manager 60 may generally represent a data aggregation point within a network or an enterprise. Embodiments of resource manager 60 may receive communications from components of information system 10 and, from the communications, monitor resource utilization within the system. For example, resource manager 60 may monitor the available capacity of database 50. As another example, resource manager 60 may monitor the available processing power of computing environment 30. As a further example, resource manager 60 may monitor traffic on server pool 40, including the number of requests being processed.

Resource manager 60 may include one or more computer systems at one or more locations. Each computer system associated with resource manager 60 may include one or more suitable input devices, output devices, mass storage media, processors, memory, interfaces, communication ports, or other appropriate components and/or software for receiving, processing, storing, and communicating information according to the operation of information system 10.

In operation, resource manager 60 may predict future resource utilizations for components of information system 10. In particular, resource manager 60 may record utilization data obtained from monitoring resource usage within information system 10, and use the historical utilization data to identify one or more resource usage patterns. The resource usage pattern may be identified using any suitable statistical analysis algorithm. Based on the identified pattern, resource manager 60 may forecast future resource utilization levels. The forecasted future utilization levels may be used to determine what systems and components of information system 10 are likely to fail and when the failure might occur.

As mentioned, the forecasting capabilities of resource manager 60 may be carried out using any suitable statistical analysis algorithm. For example, resource manager 60 may include a computer readable medium comprising code that, when executed, is operable to perform an Auto-Regressive Integrated Moving average (ARIMA) time series analysis to determine one or more resource usage patterns. ARIMA uses lags and shifts in historical data to uncover patterns and predict future behavior. ARIMA may be used to determine both the number of analysis points (i.e., how many historical utilization measurements) to optimally predict the next observation. and the weight that should be applied to each analysis point.

Embodiments of resource manager 60 may determine the failure of certain business services. A business service may be any functionality supported by one or more components of information system 10. For example, one or more computers 32 of computing environment 30 and server pool 40 may support the payroll services for a business. Using the described resource utilization monitoring and forecasting techniques, resource manager 60 may determine not only that the utilization level of server pool 40 will exceed its threshold utilization, but also when the threshold utilization will be breached and that the breach will disrupt payroll services.

It should be understood that modifications, additions, or omissions may be made to information system 10. Additionally, while the embodiment of information system 10 illustrated in FIG. 1 includes particular components that are each configures to provide certain functionality; alternative embodiments may include any appropriate combination of components with the described functionality divided between the components in any suitable manner.

Figure 2:
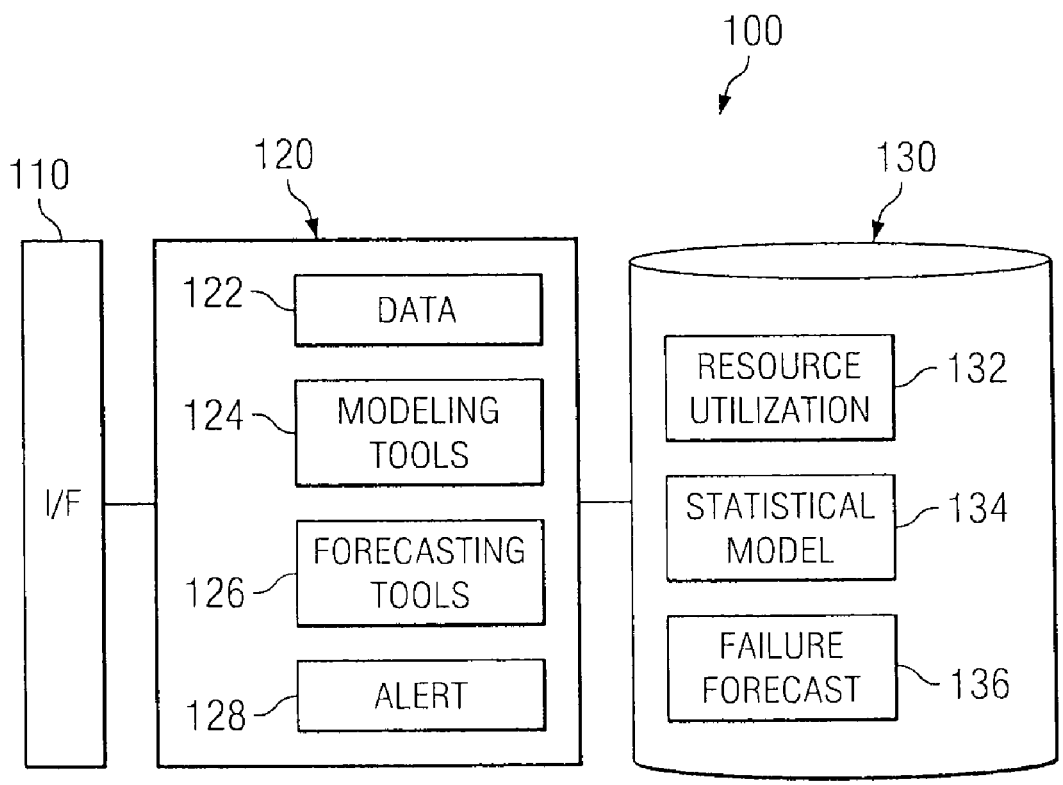
FIG. 2 is a block diagram illustrating a resource manager module according to a particular embodiment.

FIG. 2 is a block diagram illustrating some of the components of a resource manager module 100, in accordance with a particular embodiment. Resource manager module 100 may be similar to, and provide similar functionality as, resource manager 60 depicted in FIG. 1. Different embodiments may include all, some, or none of the components depicted in FIG. 2. Furthermore, resource manager module 100 may be a separate stand alone device or it may be incorporated into or a part of another device.

According to the illustrated embodiment, resource manager module 100 includes an interface 110, a processor 120, and a memory 130. Interface 110 may be any port or connection, real or virtual, including any suitable hardware and/or software that may allow resource manager module 100 to exchange information and signals. Processor 120 may be coupled to interface 110 and control the operation of resource manager module 100. In particular, processor 120 may execute commands and instructions associated with services provided by resource manager module 100. Examples of processor 120 include, application-specific integrated circuits (ASICs), field-programmable gate arrays (FGPAs), digital signal processors (DSPs), and any other suitable specific or general purpose processors. Memory 130 may be coupled to processor 130 and/or interface 120. Memory 130 may store processor instructions and/or any other appropriate information used by resource manager module 100. Examples of memory 130 may include random access memory (RAM) devices, dynamic random access memory (DRAM), read only memory (ROM) devices, magnetic storage devices, optical storage devices, flash memory, or any other suitable data storage medium.

In operation, resource manager module 100 may receive utilization information via interface 110. The resource utilization information may be associated with a particular component within a network, or a system comprising multiple components. The resource utilization data may include real-time resource utilization data as well as historical resource utilization data. In some embodiments historical utilization data may be gathered by a UNICENTER NETWORK AND SYSTEMS MANAGEMENT SYSTEMS PERFORMANCE OPTION r3.0 ("NSM SPO") produced by CA, Inc. of Islandia, N.Y., USA platform and forwarded to resource manager module 100. In certain embodiments, resource manager module 100 may receive real-time resource utilization data and record the resource utilization data locally using data processing module 122 to create a historical resource utilization log 132.

Modeling tools 124 may be used by processor 120 to identify a pattern represented by the historical utilization data and/or the real-time utilization data. Modeling tools 124 may include one or more statistical algorithms, such as ARIMA, for identifying a pattern within time series data. The pattern identified by modeling tools 124 may be stored in memory 130 as a statistical model 134.

Forecasting tools 126 may use the statistical model 134 to predict the utilization level of one or more components and/or systems in the future. For example, forecasting tools 126 may apply statistical model 134 to a future time series to predict a utilization level at one or more time points in the future. Embodiments of forecasting tools 126 may also predict when a utilization threshold for a system or component in a network will be breached. In particular, using threshold data 136, which comprises utilization thresholds of one or more components or systems in a network, and statistical model 134, forecasting tools 126 may predict when a utilization threshold for a given system or component will be breached. The predicted breach may be reported in the form of a failure forecast 136.

Embodiments of resource manager module 100 may proactively respond to a forecasted utilization level or a predicted breach of a utilization threshold. In particular, alert module 128 may generate an alert in response to a specified event. For example, alert module 128 may send an email or text message to a designated system administrator in response to determining that a threshold breach will occur within a designated time period. Alert module 128 may also implement an automatic response to a predicted threshold breach. As one example, alert module 128 may redirect resources or traffic towards or away from one or more systems or components to avert a threshold breach.

It should be understood that data processing module 122, modeling tools 124, forecasting tools 126, and alert module 128 may be implemented as logic or code embodied in a computer readable medium. In certain embodiments, the code may be stored in memory 130 and executed by processor 120. It should also be understood that components of resource manager module 100 may be combined, eliminated, or otherwise modified. In addition, data processing module 122, modeling tools 124, forecasting tools 126, and alert 128 may logically reside remotely from each other and each may be associated with a unique processor 120.

Figure 3:
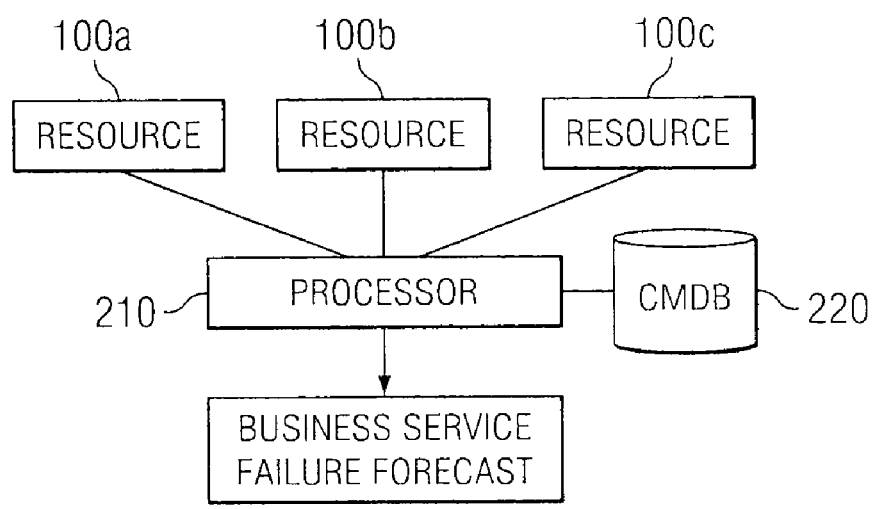
FIG. 3 is a block diagram illustrating a systems analysis module according to a particular embodiment.

FIG. 3 is a block diagram illustrating some of the components of a systems analysis module 200, in accordance with a particular embodiment. Systems analysis module 200 may be similar to, and provide similar functionality as, resource manager 60 depicted in FIG. 1. Different embodiments may include all, some, or none of the components depicted in FIG. 3. Furthermore, systems analysis module 200 may be a separate stand alone device or it may be incorporated into or a part of another device.

As illustrated, systems analysis module 200 includes a plurality of resource manager modules 100a-100c, a configuration management database (CMDB) 210 and a processor 220. Resource manager modules 100 may be similar to resource manager modules 100 described with respect to FIG. 2. CMDB 210 may store relationships between different enterprise entities, such as systems and applications. The relationships may indicate dependencies between and/or among enterprise entities and how such entities converge to form a given business service. CMDB may also store processor instructions and/or any other appropriate information used by systems analysis module 200. An example of CMDB 210 is the CA Configuration Management Database (CA CMBD) manufactured by CA, Inc. of Islandia, N.Y., USA. Processor 220 may be any suitable specific or general purpose processor such as, for example, an ASIC, an FGPA, or a DSP and may execute commands and instructions associated with services provided by systems analysis module 200.

In an enterprise network, the failure of one component may affect the operation of one or more components. Ultimately, the failure of one component may affect the ability of a system to provide one or more business services for an enterprise. As discussed, a business service may be any enterprise functionality supported by one or more network components. As mentioned, payroll service is one such example. Another example is email service, which may be supported by one or more servers, routers, gateways, and/or personal computers.

In operation, embodiments of system analysis module 200 may predict the failures of business services for an enterprise. CMDB may generally define the systems and components within an enterprise that are associated with a given business service. Each resource manager module 100 may monitor and manage resource utilization for one or more associated network components. Specifically, as described, each resource manager module 100 may predict both future resource utilization and a time of failure for its associated network component(s). Using enterprise relationship information from CMDB 210 and the predicted failure times of one or more system components associated with a business service, processor 220 may generate a business service failure forecast. The business service failure forecast may generally indicate when, given the predicted utilization level(s) for one or more enterprise component(s), a business service will fail.

Figure 4:
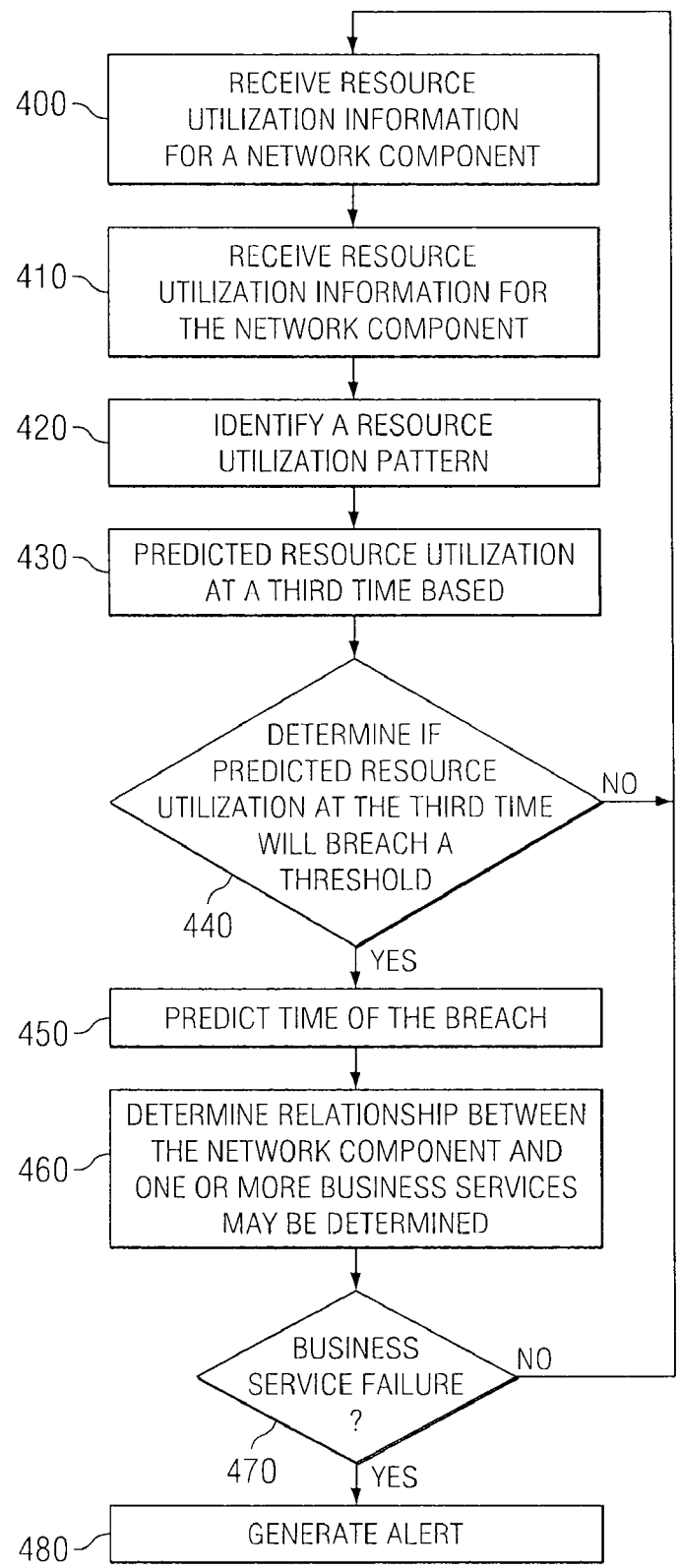
FIG. 4 is a flowchart illustrating an embodiment of a method for identifying and managing service disruptions using network and systems data.

With reference to FIG. 4, a flowchart illustrating an example method for identifying and managing disruptions using network and systems data is provided. The illustrated method begins at step 400 wherein resource utilization information for a network component is received at a first time. At step 410, resource utilization information for a network component is received at a second time. At step 420, a resource utilization pattern is identified based on the resource utilization information received at the first time and the resource utilization information received at the second time. Step 420 may be performed using ARIMA. At step 430, resource utilization for the network component is predicted at a third time based on identified resource utilization pattern. At step 440, it is determined whether, based on the predicted resource utilization, there is a utilization threshold breach for the network component. If there is a breach, then a time of the breach may be predicted for the network component, at step 450. Next, at step 460, a relationship between the network component and one or more business services may be determined. At step 470, it is determined whether the utilization threshold of the network component will cause the business service to fail. At step 480, if the utilization threshold breach will cause the business service to fail, an alert is generated.

One skilled in the art will readily recognize that some of the steps illustrated in FIG. 4 may be combined, modified or deleted where appropriate, and additional steps may also be added to the flowchart. It should also be understood that steps may be performed in any suitable order without departing from the intended scope of the invention.

Further, while the present invention has been described in detail with reference to particular embodiments, it should be understood that various other changes, substitutions, and alterations may be made hereto without departing from the spirit and scope of the present invention. Numerous other changes, substitutions, variations, and modifications may be ascertained by those skilled in the art and it is intended that the present invention encompass all such changes, substitutions, variations, and modifications as falling within the spirit and scope of the appended claims.

What is claimed is:

1. A method for identifying disruptions using network and systems data, comprising:
   receiving, at an interface, resource utilization information for a network component at a first time;
   receiving, at the interface, resource utilization information for the network component at a second time;
   identifying a resource utilization pattern for the network component;
   predicting a resource utilization for the network component at a third time based on the resource utilization pattern;
   determining whether the predicted resource utilization will breach a utilization threshold for the network component;
   based on determining that the predicted resource utilization will breach a utilization threshold for the network component, identifying a business service utilizing the network component, the business service comprising a function of an enterprise; and
   if the predicted resource utilization will breach the utilization threshold for the network component, determining whether the breach will result in a disruption to the business service.

2. The method of claim 1, further comprising, in response to determining the predicted resource utilization will breach a utilization threshold for the network component, predicting an approximate time when the breach will occur.

3. The method of claim 2, further comprising:
   determining a relationship between the network component and the business service; and
   sending an alert indicating that a network component associated with the business service will breach a utilization threshold at the predicted time.

4. The method of claim 1, wherein identifying a resource utilization pattern comprises applying an Auto-Regressive Integrated Moving average (ARIMA) time series analysis.

5. The method of claim 1, further comprising retrieving a utilization threshold for the network component from a memory device.

6. The method of claim 1, further comprising, for each of a plurality of times, predicting resource utilization for the network component.

7. The method of claim 1, further comprising creating a resource utilization log for the network component, the resource utilization log comprising the resource utilization for the network component at the first time and the resource utilization for the network component at the second time.

8. A system for identifying disruptions using network and systems data, comprising:
   an interface configured to:
     receive resource utilization information for a network component at a first time;
     receive resource utilization information for the network component at a second time; and
   a processor configured to:
     identify a resource utilization pattern for the network component;
     predict a resource utilization for the network component at a third time based on the resource utilization pattern;
     determine whether the predicted resource utilization will breach a utilization threshold for the network component;
     based on determining that the predicted resource utilization will breach a utilization threshold for the network component, identify a business service utilizing the network component, the business service comprising a function of an enterprise; and
     if the predicted resource utilization will breach the utilization threshold for the network component, determine whether the breach will result in a disruption to the business service.

9. The system of claim 8, wherein the processor is further configured to, in response to determining the predicted resource utilization will breach a utilization threshold for the network component, predict an approximate time when the breach will occur.

10. The system of claim 9, wherein the processor is further configured to:
    determine a relationship between the network component and the business service; and
    send an alert indicating that a network component associated with the business service will breach a utilization threshold at the predicted time.

11. The system of claim 8, wherein a processor configured to identify a resource utilization pattern comprises a processor configured to apply an Auto-Regressive Integrated Moving average (ARIMA) time series analysis.

12. The system of claim 8, wherein the processor is further configured to retrieve a utilization threshold for the network component from a memory device.

13. The system of claim 8, wherein the processor is further configured to, for each of a plurality of times, predict resource utilization for the network component.

14. The system of claim 8, wherein the processor is further configured to create a resource utilization log for the network component, the resource utilization log comprising the resource utilization for the network component at the first time and the resource utilization for the network component at the second time.

15. A non-transitory computer readable medium comprising software for identifying disruptions using network and systems data, the software comprising computer code such that when executed is operable to:
    receive resource utilization information for a network component at a first time;
    receive resource utilization information for the network component at a second time;
    identify a resource utilization pattern for the network component;
    predict a resource utilization for the network component at a third time based on the resource utilization pattern;
    determine whether the predicted resource utilization will breach a utilization threshold for the network component;
    based on determining that the predicted resource utilization will breach a utilization threshold for the network component, identify a business service utilizing the network component, the business service comprising a function of an enterprise; and
    if the predicted resource utilization will breach the utilization threshold for the network component, determine whether the breach will result in a disruption to the business service.

16. The medium of claim 15, wherein the code is further operable to, in response to determining the predicted resource utilization will breach a utilization threshold for the network component, predict an approximate time when the breach will occur.

17. The medium of claim 16, wherein the processor is further configured to:
    determine a relationship between the network component and the business service; and
    send an alert indicating that a network component associated with the business service will breach a utilization threshold at the predicted time.

18. The medium of claim 15, wherein code operable to identify a resource utilization pattern comprises code operable to apply an Auto-Regressive Integrated Moving average (ARIMA) time series analysis.

19. The medium of claim 15, wherein the code is further operable retrieve a utilization threshold for the network component from a memory device.

20. The medium of claim 15, wherein the code is further operable to create a resource utilization log for the network component, the resource utilization log comprising the resource utilization for the network component at the first time and the resource utilization for the network component at the second time.

21. The method of claim 1, wherein identifying a business service utilizing the network component comprises:
    identifying a business service utilizing the network component using enterprise relationship information stored in a database, the enterprise relationship information indicating a relationship between the network component and the business service.

22. The system of claim 8, wherein the processor is further configured to:
    identify a business service utilizing the network component using enterprise relationship information stored in a database, the enterprise relationship information indicating a relationship between the network component and the business service.

23. The medium of claim 15, wherein the code is further operable to:
    identify a business service utilizing the network component using enterprise relationship information stored in a database, the enterprise relationship information indicating a relationship between the network component and the business service.

* * * * *